(12) United States Patent
Heinze et al.

(10) Patent No.: US 10,723,560 B2
(45) Date of Patent: Jul. 28, 2020

(54) SIDE-BY-SIDE SNAP ON SLATS FOR A CHAIN CONVEYOR BELT AND CONVEYOR BELT SYSTEM COMPRISING SAME

(71) Applicant: PRINCE CASTLE LLC, Carol Stream, IL (US)

(72) Inventors: Karl R. Heinze, Chicago, IL (US); Ulf Bauer, Wuppertal (DE)

(73) Assignee: Prince Castle LLC, Carol Stream, IL (US)

( * ) Notice: Subject to any disclaimer, the term of this patent is extended or adjusted under 35 U.S.C. 154(b) by 567 days.

(21) Appl. No.: 15/356,517

(22) Filed: Nov. 18, 2016

(65) Prior Publication Data

US 2018/0140124 A1 May 24, 2018

(51) Int. Cl.
- A47J 27/00 (2006.01)
- B65G 17/06 (2006.01)
- B65G 21/00 (2006.01)
- A47J 37/04 (2006.01)

(52) U.S. Cl.
CPC ............ B65G 21/00 (2013.01); A47J 37/045 (2013.01); B65G 17/063 (2013.01)

(58) Field of Classification Search
CPC ....... B65G 17/063; B65G 21/00; A47J 37/045
USPC ....................................................... 99/443 C
See application file for complete search history.

(56) References Cited

U.S. PATENT DOCUMENTS

| 2,987,167 | A |   | 6/1961  | Franz |
|-----------|---|---|---------|-------|
| 4,394,901 | A |   | 7/1983  | Roinestad |
| 4,458,809 | A | * | 7/1984  | White .................... B65G 13/07 198/789 |
| 4,473,365 | A |   | 9/1984  | Lapeyre |
| 5,307,923 | A |   | 5/1994  | Damkjaer |
| 6,223,889 | B1 |  | 5/2001  | Layne et al. |
| 6,581,758 | B1 |  | 6/2003  | van-Zijderveld et al. |
| 6,707,014 | B1 | * | 3/2004  | Corey ..................... A23L 3/185 198/844.1 |
| 6,918,486 | B2 |  | 7/2005  | Shibayama et al. |
| 7,278,535 | B2 |  | 10/2007 | Damkjær |
| 7,314,132 | B2 |  | 1/2008  | Layne et al. |
| 7,419,051 | B2 |  | 9/2008  | Damkær |
| 7,530,455 | B2 |  | 5/2009  | Lucchi |
| 7,708,135 | B2 |  | 5/2010  | Ellerth et al. |
| 7,721,877 | B2 |  | 5/2010  | Maine, Jr. et al. |
| 7,800,023 | B2 |  | 9/2010  | Burtea et al. |
| 7,878,323 | B2 |  | 2/2011  | Van Rees et al. |
| 7,975,840 | B2 |  | 7/2011  | Messick, Jr. et al. |
| 7,987,972 | B2 |  | 8/2011  | Hennigar et al. |

(Continued)

FOREIGN PATENT DOCUMENTS

JP    H06-141985 A    5/1994

*Primary Examiner* — Lorne E Meade
*Assistant Examiner* — Kuangyue Chen
(74) *Attorney, Agent, or Firm* — Andrus Intellectual Property Law, LLP (57) ABSTRACT

A conveyor belt system provides a continuous flat support surface for a food item that moves the food item through a food preparation device. The conveyor belt system includes a conveyor belt having a plurality of spaced apart rods and a plurality of slats that are removably attached to the conveyor belt with a snap on mechanism. The slats also include a lateral connection mechanism for lateral removable attachment to an adjacent slat. The slats are easily assembled and provide enhanced field service and/or replacement capability.

19 Claims, 11 Drawing Sheets

(56) References Cited

U.S. PATENT DOCUMENTS

| | | |
|---|---|---|
| 8,113,340 B1 | 2/2012 | Smith et al. |
| 8,499,928 B1 | 8/2013 | Liao et al. |
| 8,506,687 B2 | 8/2013 | Jones |
| 8,752,698 B2 | 6/2014 | Lasecki et al. |
| 8,863,944 B2 | 10/2014 | MacLachlan |
| 8,939,279 B2 | 1/2015 | Porter et al. |
| 9,073,694 B2 | 7/2015 | Ozaki |
| 9,221,611 B2 | 12/2015 | Ulchak et al. |
| 2010/0275789 A1* | 11/2010 | Lee .................... A47J 37/0857 99/386 |
| 2013/0034319 A1* | 2/2013 | Yoshida ................ F16C 29/008 384/43 |
| 2013/0277184 A1* | 10/2013 | Ozaki .................... B65G 15/30 198/853 |
| 2015/0129395 A1 | 5/2015 | Messick, Jr. |
| 2015/0151919 A1 | 6/2015 | Messick, Jr. et al. |
| 2015/0191312 A1 | 7/2015 | Ulchak et al. |
| 2015/0231434 A1* | 8/2015 | Lin .......................... A63B 5/22 482/51 |
| 2015/0360871 A1* | 12/2015 | Westergaard Andersen ................ B65G 17/08 198/617 |
| 2016/0185529 A1 | 6/2016 | Bauer |
| 2016/0185530 A1 | 6/2016 | Malkowski et al. |

\* cited by examiner

SIDE-BY-SIDE SNAP ON SLATS FOR A CHAIN CONVEYOR BELT AND CONVEYOR BELT SYSTEM COMPRISING SAME

FIELD OF THE INVENTION

The disclosure is directed to a conveyor belt for conveying food items into a heated food preparation chamber, such as a toaster. In particular, the disclosure is directed to side-by-side snap on slats for a conveyor belt that minimizes costs, simplifies field maintenance, and simplifies manufacturing and assembly of a conveyor belt including the snap on slats.

BACKGROUND

In the food preparation industry often food items are prepared, at least partially, by placing the food items on a conveyor belt that transports the food items into a food preparation device, such as a toaster or oven. Such toasters and ovens may include a heating device, such as a heated platen, and a slowly rotating conveyor belt. The conveyor belt holds the food item in close proximity to the platen while the conveyor belt simultaneously transports the food item through the preparation device. The length of time the food item is exposed to the heated platen may vary based on the length of the platen and the speed of the conveyor belt. Such toasters may process food items continuously as opposed to household toasters that process food items in batch mode, such as two or four pieces of bread at a time. Conveyor toasters are ill-suited for consumer use because of their size, manufacturing cost, power requirements, and the time required to pre-heat the platen to operating temperature. However, conveyor toasters are preferred by restaurants and food services that require high-volume through-put and consistent heating/toasting.

Figure 1:
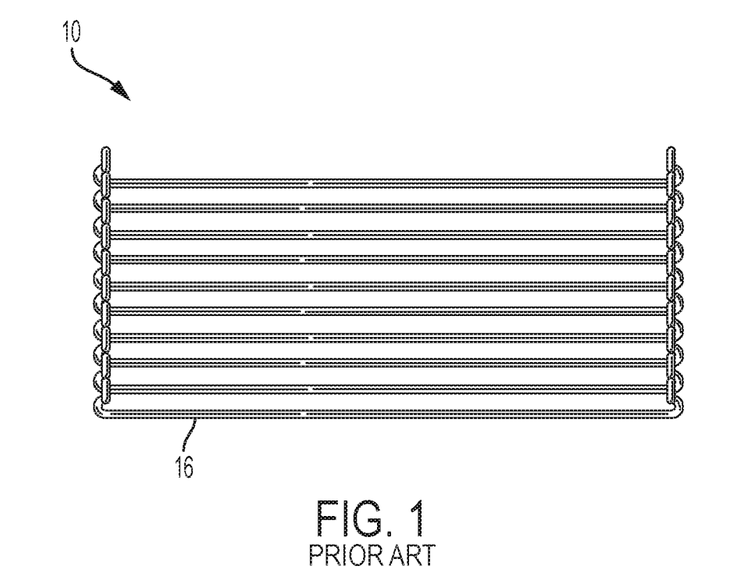
FIG. 1 is a top view of a segment of a conventional wire conveyor belt.
Figure 2:
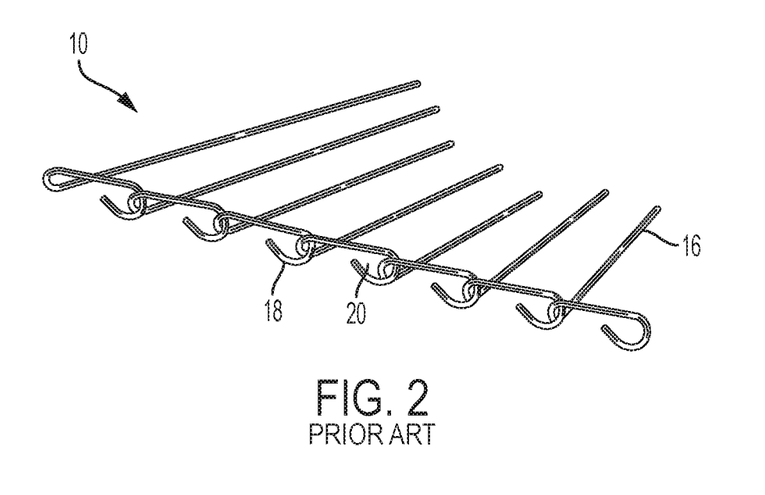
FIG. 2 is a side perspective view of the wire conveyor belt segment shown in FIG. 1.
Figure 3A:
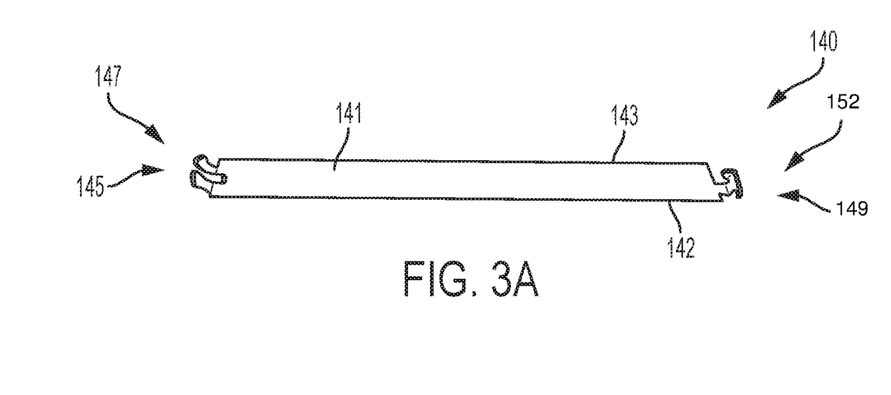
FIG. 3A is a bottom perspective view of one embodiment of a side-by-side slat for use on a wire conveyor belt system.
Figure 3B:
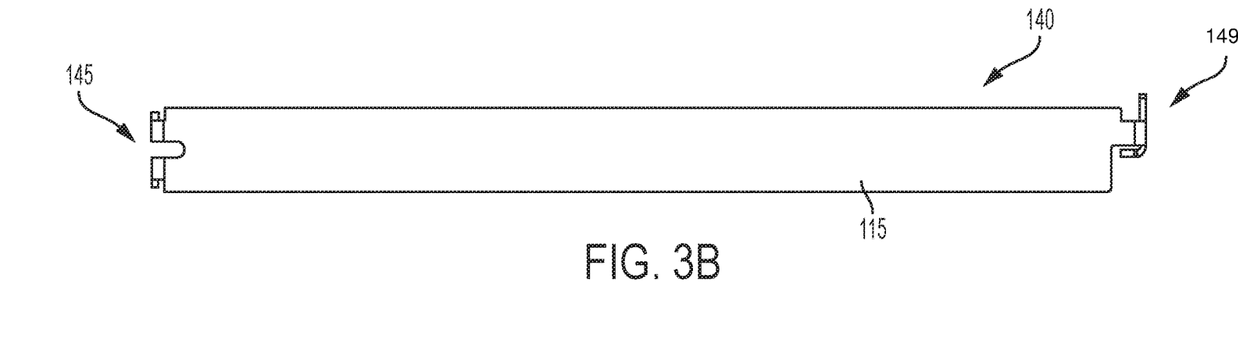
FIG. 3B is a top plan view of the side-by-side slat of FIG. 3A.
Figure 3C:
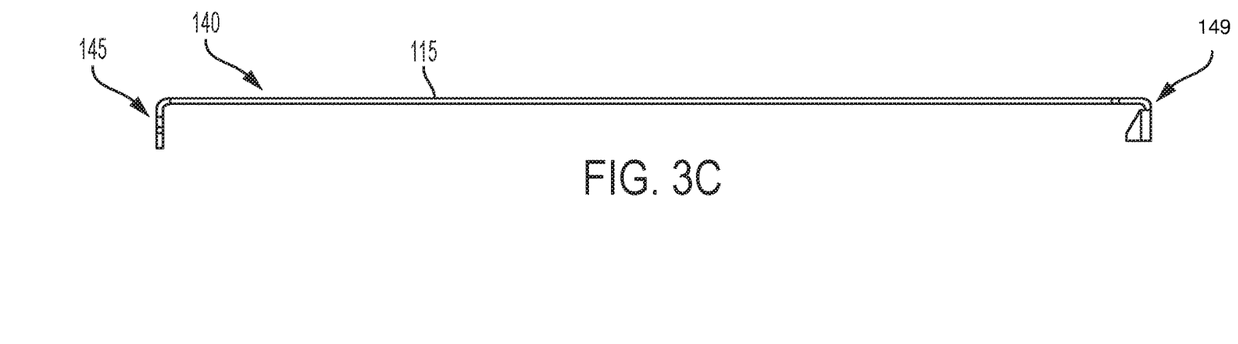
FIG. 3C is a side elevational view of the side-by-side slat of FIG. 3A.
Figure 3D:
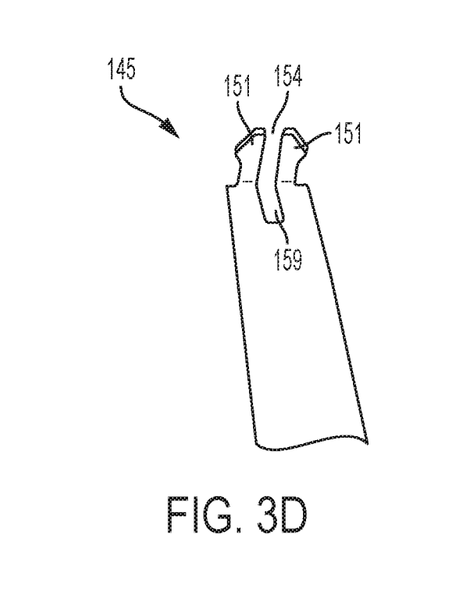
FIG. 3D is a perspective view of a first end of the side-by-side slat of FIG. 3A, identified by the circle 3D in FIG. 3A.
Figure 3E:
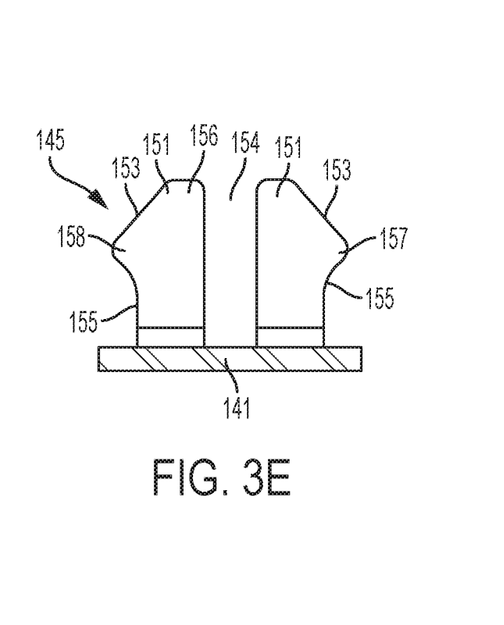
FIG. 3E is a side elevational view of the first end of FIG. 3D.
Figure 3F:
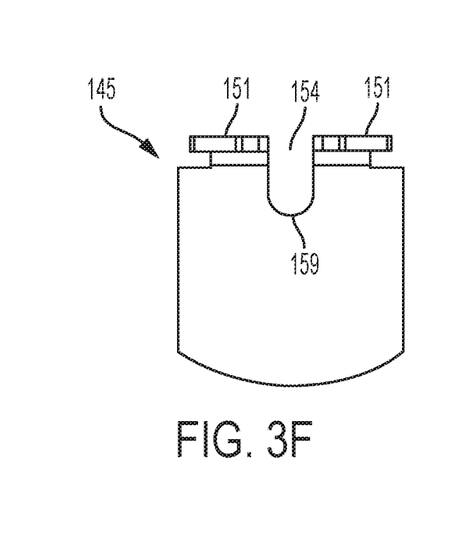
FIG. 3F is a top plan view of the first end of FIG. 3D.
Figure 3G:
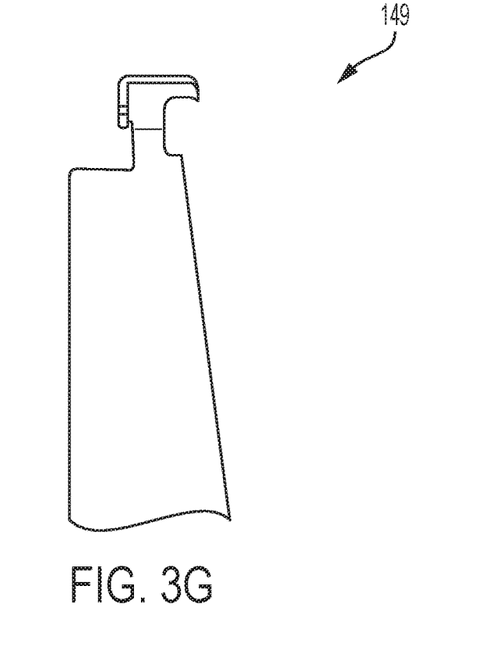
FIG. 3G is a perspective view of a second end of the side-by-side slat of FIG. 3A, identified by the circle 3G in FIG. 3A.
Figure 3H:
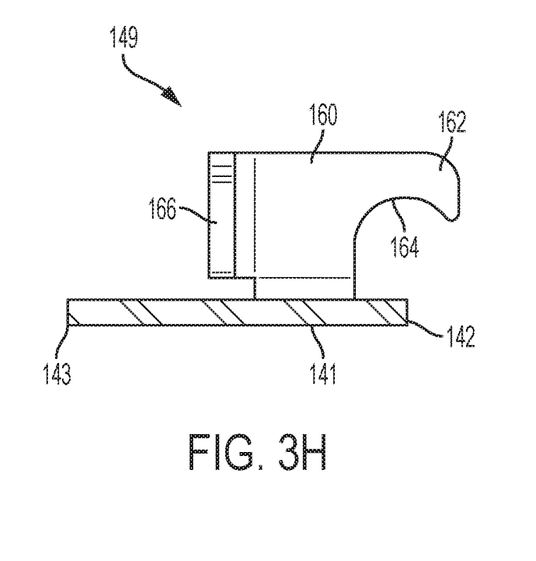
FIG. 3H is a side elevational view of the second end of FIG. 3G.
Figure 3I:
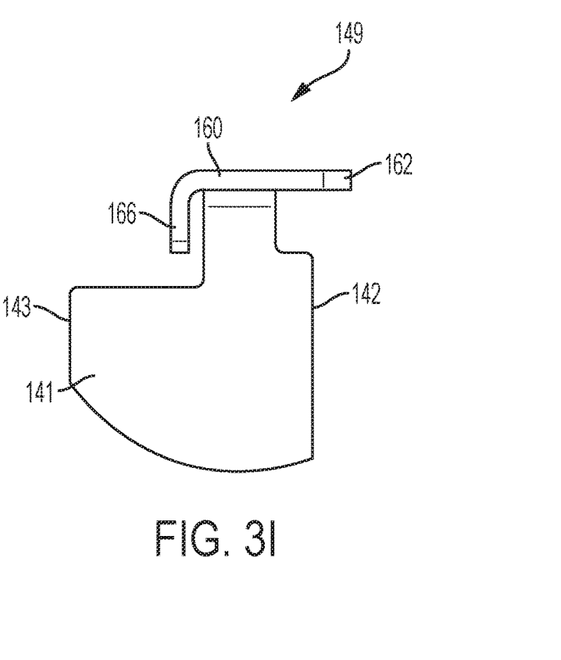
FIG. 3I is a top plan view of the second end of FIG. 3G.

Conveyor toasters generally include a wire conveyor belt. Wire conveyor belts are ideal for material handling, cooking, icing, slicing, breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. One such known wire conveyor belt is illustrated in FIGS. 1 and 2. The wire conveyor belt 10 may include a plurality of spaced metal rods 16 interconnected by coupling "hook" and "loop" connection elements 18, 20 formed at the rod ends of adjacent metal rods 16. The rods 16 may support a food item and the rods 16 may hold the components of the belt together by way of the interconnected hook and loop connection elements 18, 20. Other types of wire conveyor belts may include spaced adjacent metal rods as well. For example, a roller chain conveyor includes spaced metal rods similar to those illustrated in FIGS. 1 and 2.

One known conveyor belt, for example, is the wire conveyor belt disclosed in U.S. Pat. No. 7,987,972, which is herein incorporated by reference in its entirety. The wire conveyor belt provides a flat support surface, but is relatively expensive to produce and is cumbersome to assemble and relatively difficult to repair or replace in the field. The plates are attached to a first spaced rod at a first end and to a second spaced rod that is adjacent to the first spaced rod at the second end.

SUMMARY

According to some aspects, a conveyor belt assembly for a food preparation device includes a conveyor belt, the conveyor belt having a plurality of spaced rods, a drive mechanism for moving the conveyor belt, and a plurality of slats. At least one of the slats in the plurality of slats includes a flat body portion having a top surface and a bottom surface. The at least one slat is removably attached to the conveyor belt with a snap on mechanism. The snap-on mechanism is located at a first end of the at least one slat. The at least one slat is removably attached to an adjacent slat with a slat connection element, which is located at a second end of the at least one slat.

According to another aspect, a food preparation device includes a housing, a heating element located within the housing, and a conveyor belt assembly. The conveyor belt assembly includes a conveyor belt having a plurality of spaced rods, a drive mechanism for moving the conveyor belt, and a plurality of slats. At least one of the slats in the plurality of slats includes a flat body portion having a top surface and a bottom surface. The at least one slat is removably attached to the conveyor belt with a snap on mechanism. The snap-on mechanism is located at a first end of the at least one slat. The at least one slat is removably attached to an adjacent slat with a slat connection element, which is located at a second end of the at least one slat.

According to yet another aspect, a slat for a conveyor belt assembly includes a flat body portion, a snap on mechanism disposed at a first end of the flat body portion and a slat connection element disposed at a second end of the flat body portion. The snap on mechanism includes two legs that extend away from a bottom surface of the flat body portion. The two legs are separated by a gap. The two legs are deformable towards one another to decrease the gap during installation of the flat body portion on a conveyor belt. The slat connection element includes a plate that extends downward, away from the flat body portion and substantially perpendicular to the flat body portion.

In accordance with the teachings of the disclosure, any one or more of the foregoing aspects of a conveyor belt assembly may further include any one or more of the following optional forms.

In some optional forms, the snap on mechanism comprises two legs that extend away from the bottom surface of the flat body portion, the two legs being separated from one another by a gap.

In other optional forms, the gap includes a radiused top.

In yet other optional forms, the legs include an angled leading surface.

In yet other optional forms, the angled leading surface forms a narrower leg portion distal to the flat body portion and a wider leg portion proximate the flat body portion.

In yet other optional forms, the angled leading surface terminates at a peak, which defines the widest location of the leg.

In yet other optional forms, a notch is located proximate the flat body portion, the peak being located between the notch and the angled leading surface.

In yet other optional forms, the notch includes a surface that forms an arc of a circle.

In yet other optional forms, the slat connection element includes a plate that extends downward, away from the flat body portion and substantially perpendicular to the flat body portion.

In yet other optional forms, the slat connection element includes a hook that extends forward from the plate.

In yet other optional forms, the hook includes a radiused surface that is sized and shaped to seat a portion of a rod in the plurality of spaced apart rods.

In yet other optional forms, the slat connection element includes a stabilizing wall that extends from the plate aft, towards a trailing edge of the flat base portion.

In yet other optional forms, the stabilizing wall is substantially perpendicular to the plate and that extends towards a side surface of the flat base portion.

DETAILED DESCRIPTION

A conveyor belt system with a plurality of side-by-side snap on slats supports a food product and moves the food product through a food preparation device, such as a toaster or oven, without substantially marking or pinching the food product. Additionally, the conveyor belt system with side-by-side snap on slats eases assembly of the conveyor belt system while also providing the ability to replace or repair individual slats in the field without the need for specialized tools. Individual slats may be made of any material that is durable enough to withstand temperatures within the food preparation device. Examples of slat materials include metals, such as copper, iron, aluminum, and nickel, and/or metal alloys such as steel, brass, and bronze. Stainless steel is one preferred material for manufacturing the slats and AISI T-304 is an exemplary type of stainless steel that may be preferred.

Turning now to FIGS. 3A-3I, each slat 140 includes a flat base portion 141 having a leading edge 142 and a trailing edge 143 relative to the direction of conveyance. Each slat 140 also includes a snap on connection element 145 at a first end 147 of the flat base portion 141 and a slat connection element 149 at a second end 152 of the flat base portion 141. The snap on connection element 145 extends substantially perpendicular to the flat base portion 141 and away from a top surface 115. The snap on connection element 145 removably secures the slat 140 to a conveyor belt by sliding between two adjacent rods and expanding after passing the rods so that the slat 140 may be separated from the conveyor belt by applying a force in a direction opposite the snap on connection element 145, for example, by pulling the slat 140 away from the conveyor belt. The snap on connection element 145 leaves the leading edge 142 and the trailing edge 143 free of any attachment either with adjacent slats 140 or with the rods 116, so that adjacent slats 140 may partially rotate relative to one another, for example when rotating around a sprocket.

The snap on connection element 145 may include two spaced apart legs 151 that are separated from one another by a gap 154. Each leg 151 may include an angled leading surface 153 and a notch 155. The angled leading surface 153 divides the leg 151 into a narrower portion 156 distal to the flat base portion 141 and wider portion 158 proximate to the flat base portion 141. A peak 157 may be formed between the angled leading surface 153 and the notch 155, the peak 157 defining the widest location of the leg 151. The notch 155 may be sized and shaped to receive one rod between the peak 157 and the flat base portion 141. For example, the notch 155 may include a curved surface that forms an arc of a circle, to complement the outer surfaces of cylindrical rods. The gap 147 allows the legs 151 to be displaced towards one another when the slat 140 is being secured to the conveyor belt. The gap 147 may include a radiused top 159 that disperses material stress, especially when the two legs 151 are displaced towards one another during installation of the removable slat 140.

The slat connection element 149 includes a plate 160 that extends downward, generally perpendicular to the flat base portion 141 and away from the flat base portion 141 from a side edge of the flat base portion 141. A hook 162 extends forward from the plate 160, towards the leading edge 142 of the flat base portion 141. The hook 162 includes a radiused surface 164 proximate the flat base portion 141. The radiused surface 164 may be sized and shaped to seat a rod of the conveyor belt when the slat 140 is attached to the conveyor belt. A stabilizing wall 166 extends from the plate 160 aft, towards the trailing edge 143 of the flat base portion 141. The stabilizing wall 166 is substantially perpendicular to the plate 160 and extends towards a side surface of the flat base portion 141. The stabilizing wall 166 abuts against a stabilizing wall 166 of an adjacent slat 140 when two slats 140 are connected to one another.

Figure 4A:
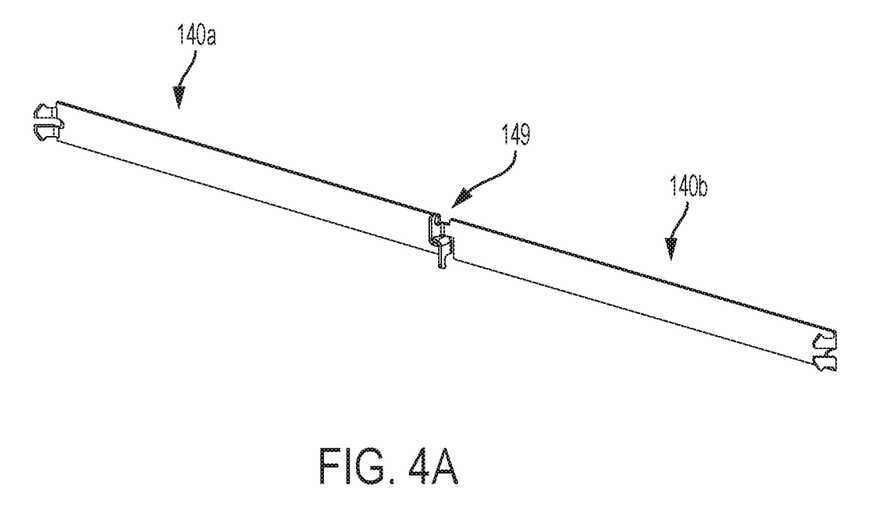
FIG. 4A is a perspective view of two side-by-side slats connected to one another.
Figure 4B:
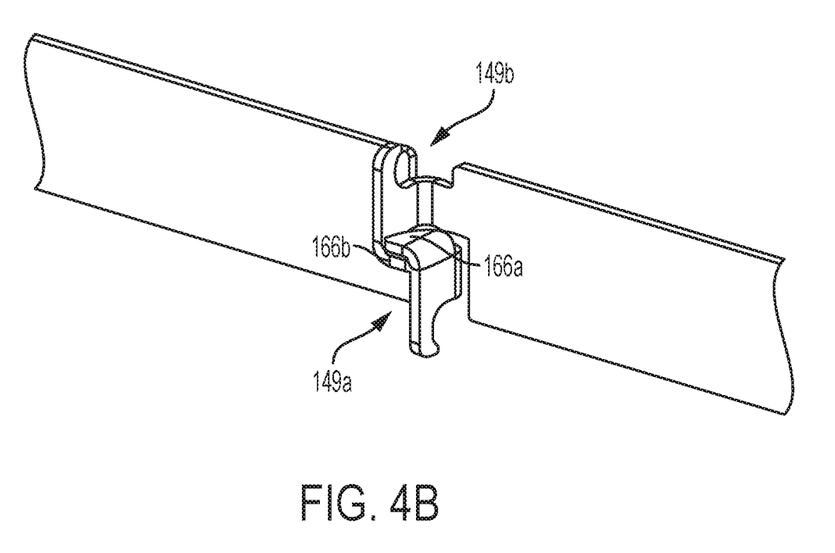
FIG. 4B is a close up perspective view of slat connection elements of the side-by-side slats of FIG. 4A.

Turning now to FIGS. 4A and 4B, two side-by-side slats 140a, 140b are connected with one another by respective slat connection elements 149a, 149b. The stabilizing walls 166a, 166b abut against one another to interlock and stabilize the side-by-side slats 140a, 140b.

Figure 5:
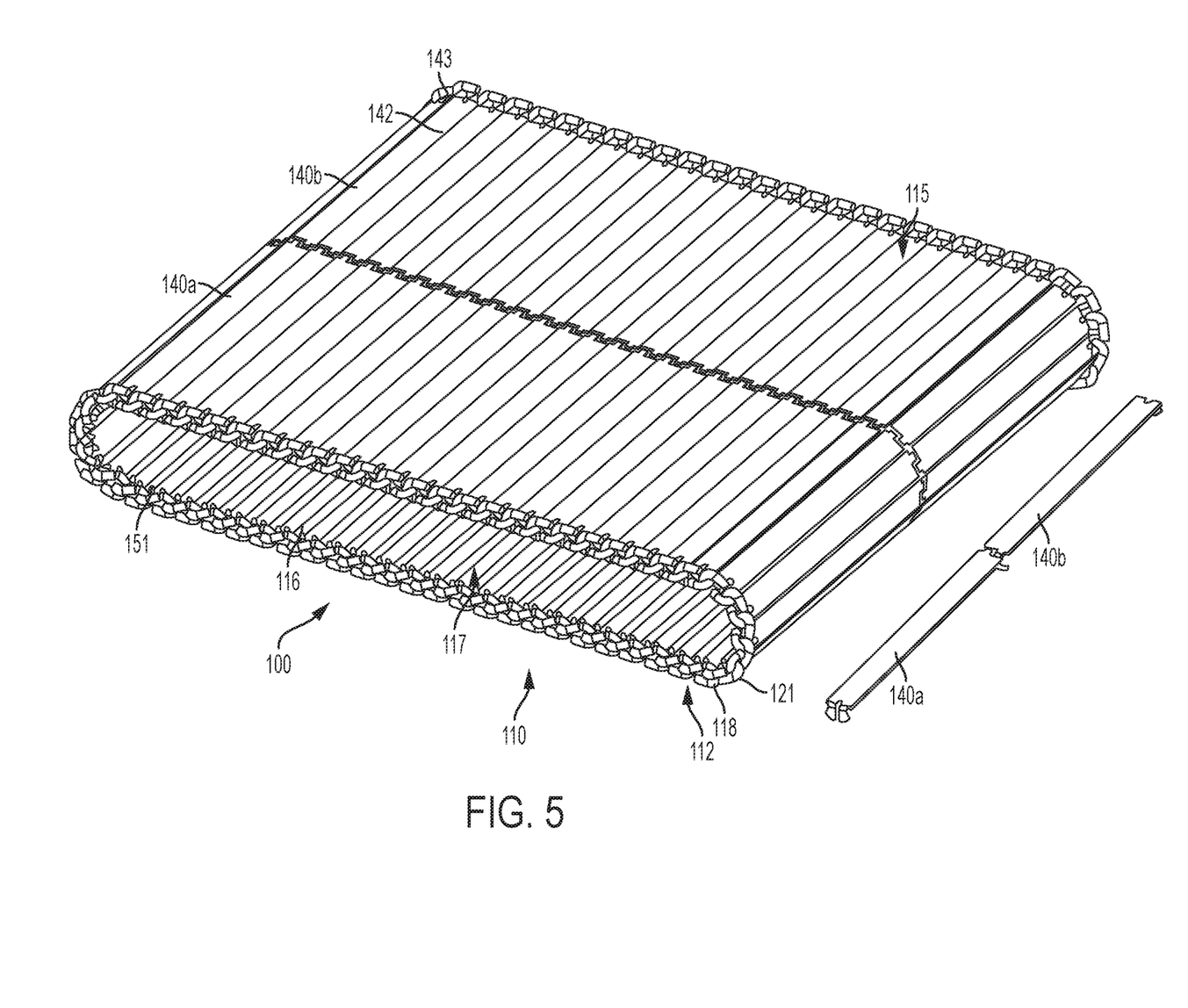
FIG. 5 is a perspective view of a conveyor belt system constructed in accordance with the disclosure, the system includes a conveyor belt and a plurality of side-by-side slats removably coupled to the conveyor belt.

Turning now to FIG. 5, a conveyor belt system 100 includes a wire conveyor belt assembly 110, which includes a drive mechanism, such as a drive sprocket (not shown).

The wire conveyor belt assembly 110 includes a wire conveyor belt 112 and a plurality of side-by-side removable slats 140. The wire conveyor belt 112 may take the form illustrated in FIGS. 1 and 2, having hook and loop connection elements, or the wire conveyor belt 112 may have any other known form that includes spaced metal rods (e.g., a roller chain conveyor belt). The plurality of slats 140 form a continuous flat support surface for conveying an item, particularly a food item through a food preparation device, such as a toaster or oven.

The conveyor belt 112 comprises a plurality of spaced metal rods 116 disposed in succession and transversely with respect to a direction of conveyance. The plurality of spaced rods 116 form the wire conveyor belt 112 which serves, in part, as a scaffolding for the plurality of removable slats 140. The wire conveyor belt 112 also interacts with the drive mechanism, to move the rods 116 and the removable slats 140 through the food preparation device. Other scaffoldings capable of receiving removable slats 140 may also be used. In the embodiment illustrated in FIG. 5, each rod 116 has two end portions 121 and a supporting rod portion 116 extending therebetween. Each end portion 121 includes a terminal hook connection element 118 that protrudes in a first direction, curves, and extends in a direction substantially opposite to the first direction for a predetermined distance. Each rod 116 also has two loop connection elements, which are formed in the rods 116 themselves. The hook connection elements 118 are interconnected/coupled to the loop connection elements of an adjacent spaced metal rod 116 to interlock adjacent metal rods 116. The hook connection elements 118 and the loop connection elements interact to allow adjacent rods 116 to pivot about an axis of the rod 116, for example while turning around the sprocket, while securing adjacent rods 116 to one another.

The conveyor belt assembly 110 includes the plurality of spaced metal rods 116 and the plurality of substantially flat slats 140. The slats 140 form a top side or support side 115 and a bottom side 117. The top side 115 forms a flat support surface for conveying the food product, and the bottom side 117 forms a platform that is at least partially supported by the rods 116.

The support surface 115 is formed by the plurality of slats 140 which are coupled to selected rods 116 of the plurality of spaced metal rods 116. The slats 140 are secured at least partially between a first spaced rod 116 of the plurality of spaced rods 116 and a second spaced rod 116, the second spaced rod 116 being separated from the first spaced rod and supporting the slat 140 so that a leading edge 142 and a trailing edge 143 are unsecured and free of any attachment, but supported along the bottom 117, thereby providing a joint that allows adjacent slats 140 to partially rotate relative to one another at the leading edge of each slat 140 and at the trailing edge of each slat 140, for example, when the slats 140 turn around the sprocket.

As illustrated in FIG. 5, when the slat 140 is secured to the conveyor belt 112, the legs 151 extend between adjacent rods 116. One rod 116 being seated within the notch of a first leg 151 (e.g., a front leg) and another rod 116 being seated within the notch of a second leg 151 (e.g., a back leg). The peak 157 (FIG. 3E) prevents the legs 151 from backing out of the gap between the rods 116. To remove the slat 140, a force may be applied in a direction away from the rods 116, which will cause the legs 151 to deform inwardly, towards one another, due to the curved surface of the notch 155 leading up to the peak 157. As the force increases, the peak 157 will eventually move far enough towards the other leg 151 that the peak 157 will be able to pass by the rod 116, thereby allowing the slat 140 to be removed from the conveyor belt 112. Alternatively, a force may be applied directly to the legs 151, pinching the distal ends of the angled leading surfaces 153 towards one another, causing the legs 151 to move towards one another to allow the peak 157 to clear the rod 116, before separating the removable slat 140 from the conveyor belt 112.

Conversely, to secure the removable slat 140 to the conveyor belt 112, the angled leading surfaces 153 of the legs 151 may be placed into a gap between two rods 116. A force may be applied towards the conveyor belt 112, which causes the legs 151 to deform inwardly, towards one another, due to the slope of the angled leading surfaces 153. Eventually, the legs 151 will deform sufficiently to allow the peak 157 to pass over the rod 116. Once the peak 157 is clear of the rod 116, the legs 151 will return to their original position, expanding away from one another, which allows the rod 116 to seat within the notch 155. The same rod 116 may also seat within a notch 155 of an adjacent slat 140. Alternatively, a force may be applied directly to the legs 151, proximate the distal ends of the angled leading surfaces 153, causing the legs 151 to move towards one another to allow the peak 157 to clear the rod 116, before moving the slat 140 towards the conveyor belt 112. Once the legs 151 are sufficiently deformed, the legs 151 may be moved into a gap between adjacent rods 116, and once the peak 157 is clear of the rod 116, the legs 151 may be allowed to expand away from one another into their original positions, which allows the rod 116 to seat in the notch 155.

Figure 10:
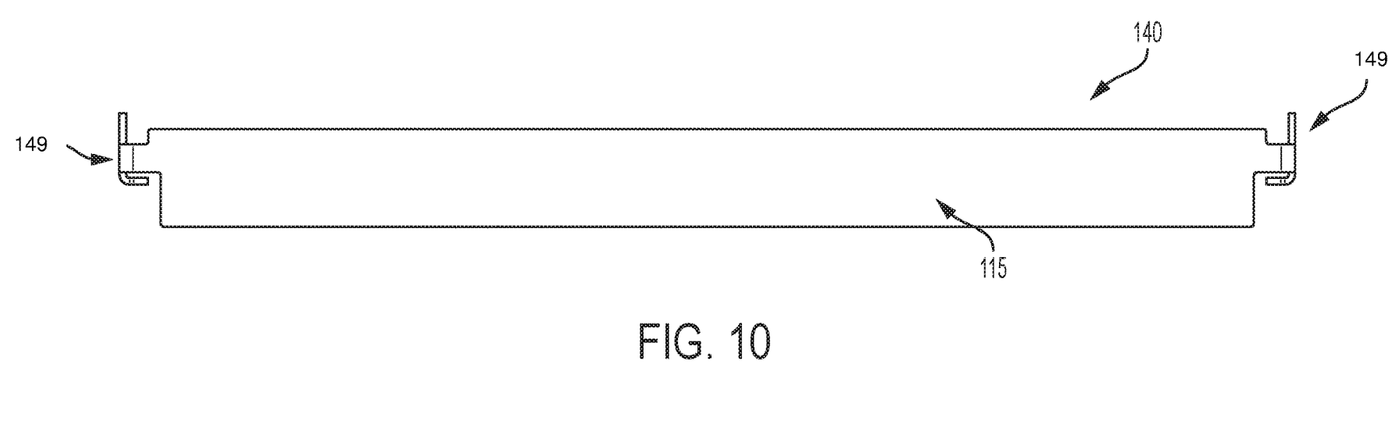
FIG. 10 is a top plan view of an alternate embodiment of a side-by-side slat.

In the embodiment of FIG. 5, the plurality of flat slats 140 includes two side-by-side flat slats 140 in each row of flat slats. A single row of flat slats 140 is illustrated in FIG. 5 by the first flat slat 140a and the second flat slat 140b, which are oriented side-by-side and illustrated apart from the conveyor belt 112. In other embodiments, each row of flat slats may include more than two side-by-side flat slats 140. For example, each row of flat slats may include 3, 4, 5, 6, or more side-by-side flat slats in a width direction of the conveyor belt 112. If more than two flat slats 140 are included in a row of flat slats, intermediate flat slats (i.e., the flat slats that are located between the two lateral outermost flat slats) may include slat connection elements 149 at each end thereof see e.g., FIG. 10). The two lateral outermost flat slats include snap on elements 145 at one end and slat connection elements 149 at another end, as illustrated in FIGS. 3A-3I.

The removable slats 140 are preferably formed from a metal material, such as stainless steel, or any other suitable material. For example, the removable slats 140 may be manufactured from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates.

In the conveyor belt system 100 of FIG. 5, the top surfaces 115 of the removable slats 140 are generally smooth. The top surfaces may, however, be corrugated or textured to better grip an item. In other embodiments, the top surfaces of the removable slats 140 may include gripping features to retain an item while the item is transported to facilitate the frictional engagement of the food product. The roughness of the surface of the removable slats 140 in one embodiment may be provided by shot peening the surfaces of the slats 140 using a predetermined shot size, as is disclosed in U.S. Patent Publication No. 2010/0275789, which is herein incorporated by reference in its entirety. Alternatively, the surface of the removable slat 140 may have gripping features such as an abrasive coating, dimples, furrows, or protrusions that would be strong enough to grip the food product, but not so abrasive that the gripping features rip, tear, or mark the food product.

Figure 6:
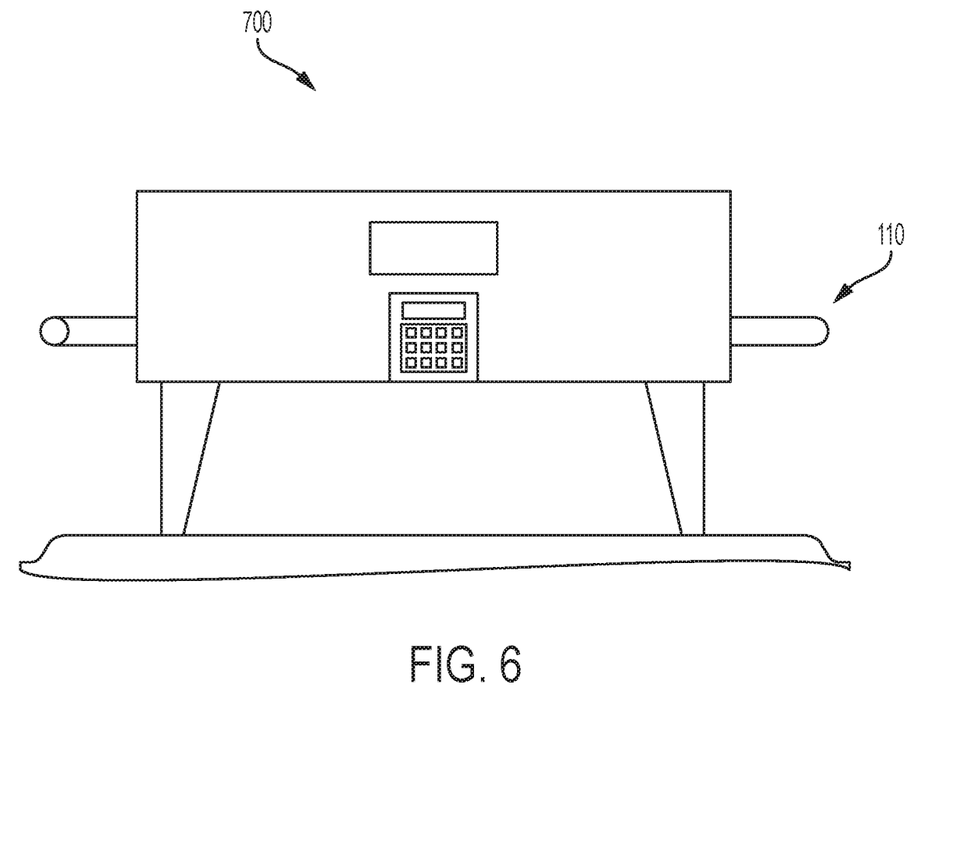
FIG. 6 is a perspective view of a horizontal toaster including the conveyor belt system of FIG. 5.
Figure 7:
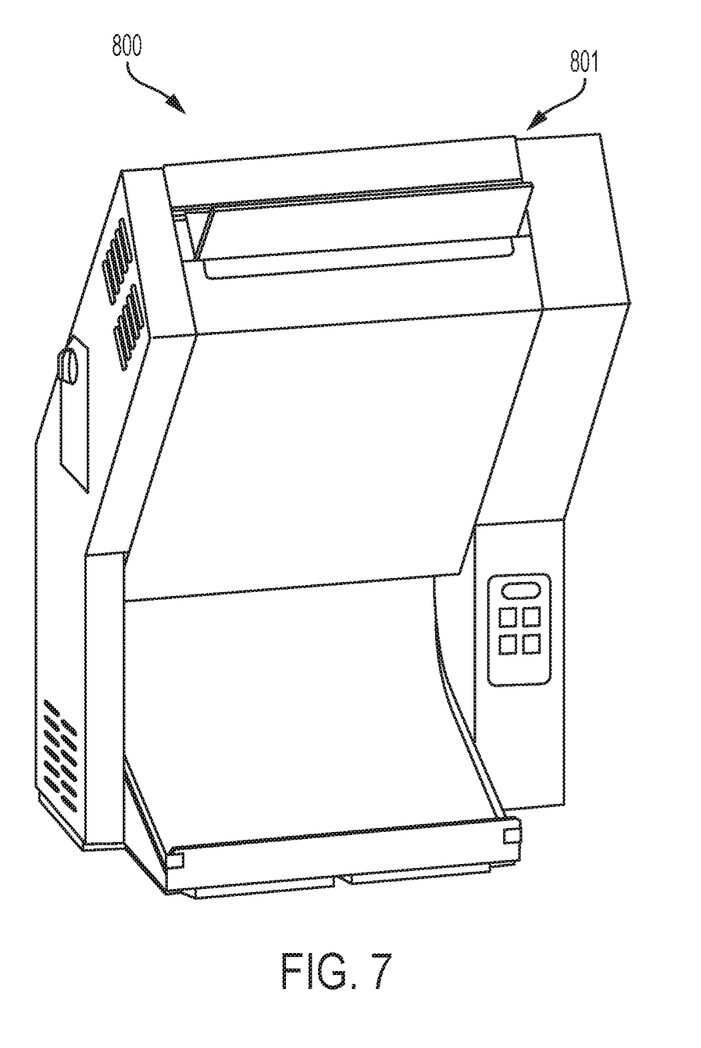
FIG. 7 is a perspective view of a vertical toaster having an angled product feed chute and including the conveyor belt system of FIG. 5.
Figure 8:
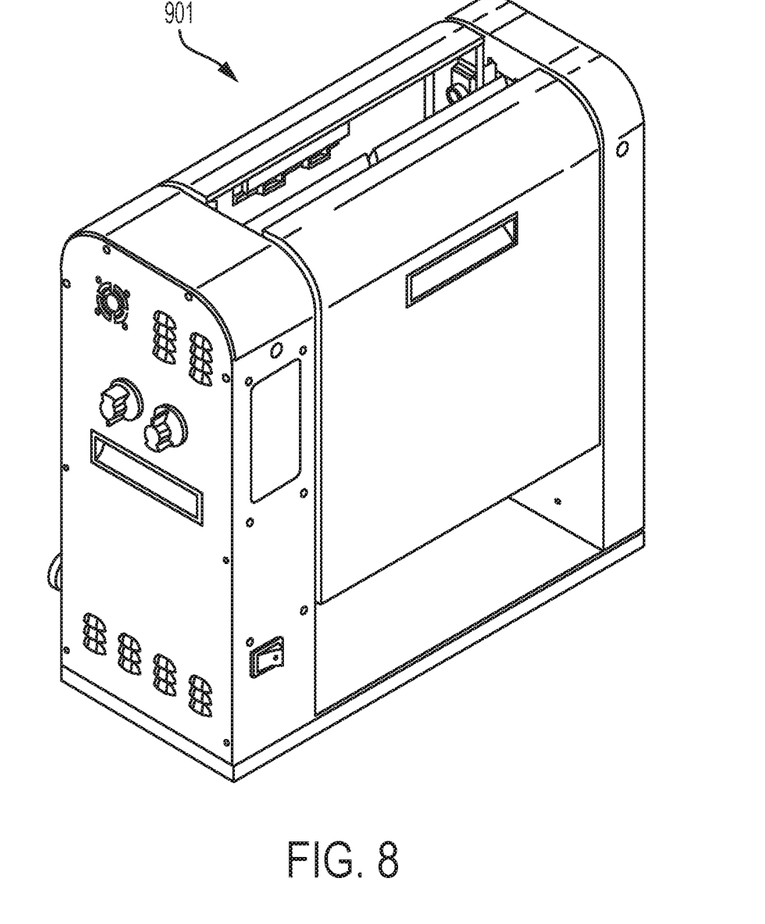
FIG. 8 is a perspective view of a vertical toaster having a vertical product feed chute and including the conveyor belt system of FIG. 5.

The conveyor belt system 100 may be used in a horizontal toaster 700 as illustrated in FIG. 6, an angled toaster 800 as illustrated in FIG. 7, or a vertical toaster 901 as illustrated in FIG. 8.

Existing conveyor toasters usually include a product feed where the product is inserted into an opening of the toaster. For example, in the angled toaster 800 in FIG. 7, the product travels down an angled shoot 801, usually angled at about 45 degrees, and is received by a conveyor belt 110 (not shown in FIG. 7). The conveyor belt assembly 110 receives the food product and urges it through an opening between the conveyor belt and a heated platen. In some conveyor toasters, the food product is compressed through this opening between the platen and the conveyor belt, also called a compressive gap, to process the food product.

Figure 9:
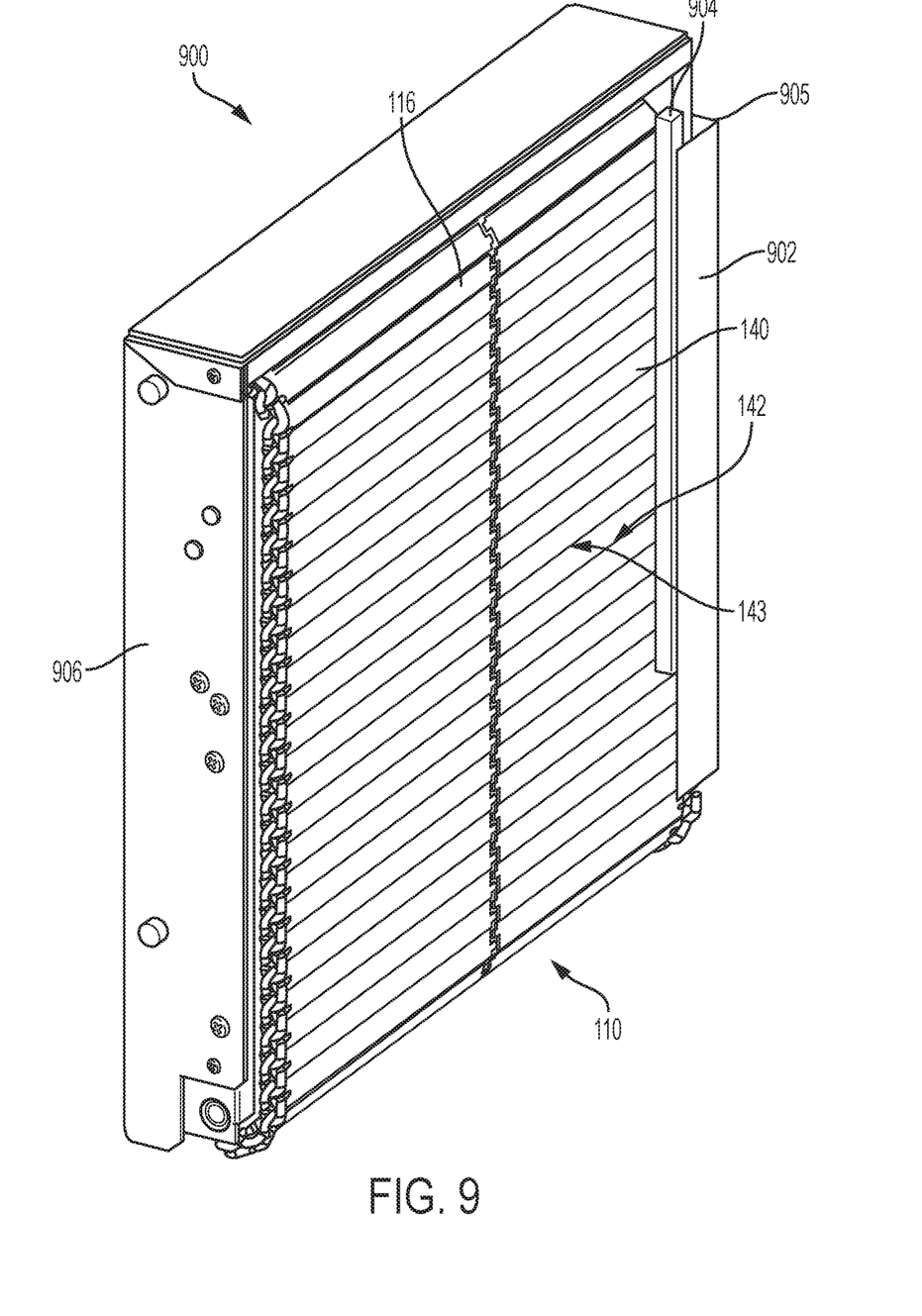
FIG. 9 is a perspective view of the vertical toaster of FIG. 8 with a cover removed revealing the conveyor belt system of FIG. 5.

The disclosed conveyor belt system 100 may be used in a vertical toaster 901, as illustrated in FIG. 8. The vertical toaster 901, an example of which is disclosed in U.S. Patent Publication No. 2010/02757789, has multiple removable and adjustable conveyor belts that receive a food product at an opening at the top of the toaster. As illustrated in FIG. 9, a vertical conveyor belt system 900 may include a guide structure 902 that runs the full length of the conveyor belt 112. In one embodiment, the conveyor belt system 900 may include a guide structure 902 on both ends of the conveyor belt assembly 110. The guide bar 904 may be fixed to a bracket 905 that attaches the guide bar 904 to the conveyor belt housing 906. The vertical toaster 901 includes a heating element (not shown), such as a heated platen, for example.

In accordance with a preferred embodiment of the conveyor belt system, the compression gap can be adjusted according to varying sizes of food product. In one embodiment, the conveyor belt can be adjusted with respect to the reactive surface as illustrated and explained in U.S. Patent Publication No. 2010/0275789.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt assembly for moving a food product through a food preparation device, the conveyor belt assembly comprising:
   a conveyor belt, the conveyor belt comprising a plurality of spaced rods including a first rod and a second rod; and
   first and second slats each comprising a flat body portion having a top surface and a bottom surface, two legs that extend away from the bottom surface at an outer end of the flat body portion, the two legs being separated by a gap, and a slat connection element that extends away from the bottom surface at an interior end of the flat body portion;
   wherein the first and second slats are secured between the first and second rods of the plurality of spaced rods by engagement of the legs of the first and second slats against the first and second rods and the first slat is secured to the second slat by engagement of the respective slat connection elements.

2. The conveyor belt assembly of claim 1, wherein each slat connection element includes a plate that extends downward, away from the flat body portion and substantially perpendicular to the flat body portion.

3. The conveyor belt assembly of claim 2, wherein the slat connection element includes a hook extending from the plate.

4. The conveyor belt assembly of claim 3, wherein the hook comprises a concave radiused surface sized and shaped to seat a portion of the first rod or the second rod to secure the interior end of the first or second slat to the first or second rod.

5. The conveyor belt assembly of claim 2, wherein each slat connection element includes a stabilizing wall that extends from the plate in a direction interior the flat body portion towards the outer end of the flat body portion.

6. The conveyor belt assembly of claim 5, wherein engagement of the respective slat connection elements comprises engagement between the stabilizing walls of the first and second slats.

7. The conveyor belt assembly of claim 1, wherein the flat body portions each comprise a leading edge and a trailing edge and wherein when the first and second slats are secured between the first and second rods, the first rod and the second rod respectively extend beyond the leading and trailing edges of the flat body portions.

8. The conveyor belt assembly of claim 1, wherein the plurality of slats includes three or more side-by-side slats in a row of slats.

9. The conveyor belt assembly of claim 8, wherein the plurality of slats comprises three side-by-side slats that include a first lateral outermost slat, at least one intermediate slat, and a second lateral outermost slat, the at least one intermediate slat including slat connection elements at a first end and at a second end, and the first and second lateral outermost slats including a slat connection element at one end and a snap-on mechanism at another end.

10. A food preparation device comprising:
    a housing;
    a heating element located within the housing; and
    a conveyor belt assembly, the conveyor belt assembly comprising:
    a conveyor belt, the conveyor belt including a plurality of spaced rods including a first rod and a second rod; and
    first and second slats each comprising a flat body portion having a top surface and a bottom surface, two legs that extend away from the bottom surface at an outer end of the flat body portion, the two legs being separated by a gap, and a slat connection element that extends away from the bottom surface at an interior end of the flat body portion;
    wherein the first and second slats are secured between the first and second rods of the plurality of spaced rods by engagement of the legs of the first and second slats against the first and second rods and the first slat is secured to the second slat by engagement of the respective slat connection elements.

11. The food preparation device of claim 10, wherein each slat connection element includes a plate that extends downward, away from the flat body portion and substantially perpendicular to the flat body portion.

12. The food preparation device of claim 11, wherein the slat connection element includes a hook extending from the plate.

13. The conveyor belt assembly of claim 12, wherein the hook comprises a concave radiused surface sized and shaped to seat a portion of the first rod or the second rod to secure the interior end of the first or second slat to the first or second rod.

14. The conveyor belt assembly of claim 10, wherein each slat connection element includes a stabilizing wall that extends from the plate in a direction interior the flat body portion towards the outer end of the flat body portion.

15. The conveyor belt assembly of claim 14, wherein engagement of the respective slat connection elements comprises engagement between the stabilizing walls of the first and second slats.

16. A slat for a conveyor belt assembly, the slat comprising:
a flat body portion having a leading edge and a trailing edge, the flat body portion being elongated along the leading edge and the trailing edge between an outer end and an interior end;
a snap on mechanism disposed at the outer end of the flat body portion the snap on mechanism including two legs that extend away from a bottom surface of the flat body portion, the two legs being separated by a gap, the two legs being configured to engage first and second rods of a conveyor belt of the conveyor belt assembly to which the slat is secured; and
a slat connection element disposed at the interior end of the flat body portion, the slat connection element including a plate that extends downward, away from the bottom surface of the flat body portion and substantially perpendicular to the flat body portion, a hook extending from the plate and beyond the leading edge or the trailing edge of the flat body portion and including a concave radiused surface configured to engage the first or second rod of the conveyor belt.

17. The conveyor belt assembly of claim 16, wherein the concave radiused surface is sized and shaped to seat a portion of a rod to which the slat is configured to be secured.

18. The conveyor belt assembly of claim 16, wherein the slat connection element includes a stabilizing wall that extends from the plate in a direction interior the flat body portion towards the outer end of the flat body portion.

19. The conveyor belt assembly of claim 18, wherein the stabilizing wall is substantially perpendicular to the plate and that extends towards a side surface of the flat body portion.

* * * * *